Aug. 9, 1938. W. N. GOODWIN, JR Re. 20,823

PHOTOELECTRIC CELL CIRCUIT

Original Filed June 23, 1933

Inventor:

William Nelson Goodwin, Jr

By Byrne, Townsend & Potter,

Attorneys.

Reissued Aug. 9, 1938 Re. 20,823

UNITED STATES PATENT OFFICE 20,823

PHOTOELECTRIC CELL CIRCUIT

William Nelson Goodwin, Jr., Newark, N. J., assignor to Weston Electrical Instrument Corporation, Newark, N. J., a corporation of New Jersey Original No. 2,032,010, dated February 25, 1936, Serial No. 677,332, June 23, 1933. Application for reissue February 10, 1938, Serial No. 189,905

12 Claims. (Cl. 250—41.5)

This invention relates to circuits for photoelectric cells of the flat disk or barrier layer type, and more particularly to measuring relay circuits in which the direction and magnitude of current flow are to depend upon a difference in the light intensities at two cells of the barrier layer type.

It has been found impractical to connect current-generating photoelectric cells of the barrier layer type differentially in series opposition, that is, in a single series circuit including two cells and a current responsive device, the circuit connections being such that the voltage generated in one cell directly opposes that generated in the other. This arises from the fact that the voltage and resistance characteristics of these cells are affected by temperature and other effects. Since each cell works into the other, the current output of each is not determined solely by the light intensity at that cell but varies with the voltage and resistance of the second cell. On the other hand, the current generated in a relatively low resistance circuit is practically independent of temperature conditions and is stable. For this reason, each cell must be so connected in a relatively low resistance circuit, and the circuits so arranged that the effects of the currents can be differentially combined in opposition.

An object of the invention is to provide a sensitive and stable photoelectric cell circuit including a pair of cells of the barrier layer type and a current response member subjected to the differential action of currents generated by the cells. A further object is to provide a circuit of the type stated, and in which current generated by one cell may flow in a circuit which does not include the other cell. More particularly, an object is to provide a relay system including a pair of photoelectric cells of the barrier layer type and a relay, the electrical network of said cells including a common path or branch in which the relay is located and in which the separate cells tend to establish current flow in opposite directions, and other branches which complete a series circuit for each cell.

These and other objects and advantages of the invention will be apparent from the following specification when taken with the accompanying drawing, in which.

Figure 1:
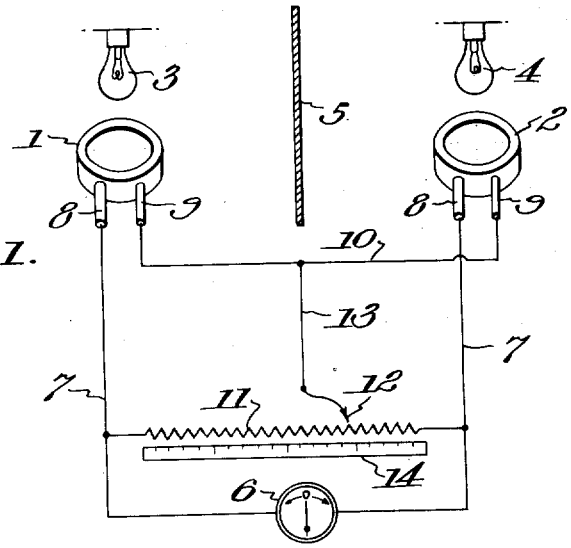
Fig. 1 is a circuit diagram of an embodiment of the invention which is appropriate for a determination of the relative illumination of two photoelectric cells.

In the drawing, the reference numerals 1, 2, identify two photoelectric cells of the direct action or barrier layer type, the cells being usually of similar design and operating characteristics. The cells are subjected to illumination from two different sources or to light rays reaching the cells from the same source but by different paths. As represented diagrammatically in the drawing, this condition of unequal illumination may obtain when the cells 1, 2 are illuminated by separate light sources 3, 4, respectively, a shield 5 being positioned to prevent a cross-illumination of the cells.

A measuring instrument 6 is a series element in the lead 7 that connects similar electrodes 8 of the two cells, and the other pair of similar electrodes 9 are joined by a lead 10. It will be noted that leads 7 and 10 complete a series circuit which includes the cells and instrument, the cells being oppositely arranged in the circuit and thereby tending to establish current flow in opposite directions.

In accordance with the invention, additional circuit elements are provided to complete relatively independent circuits for each cell. As illustrated, a resistance 11 is shunted across the measuring instrument, and an adjustable tap 12 on the resistance is connected to the lead 10 through a connection 13. If desired, a scale 14 may be provided to indicate, on some convenient system of graduations, the setting of the tap 12 along resistance 11.

The added circuit elements cooperate with the original series circuit to form a plurality of loop circuits which have portions in common, but in which the cells are in the non-common portions of different loop circuits. When either cell is darkened, the resistance of the loop circuit of that cell is very high, but the loop circuit of the other cell provides a relatively low resistance path for current flow in accordance with the illumination at the other cell.

The tap 12 is adjustable over resistance 11 to balance the current output from the two cells, but not their output voltages, by regulating the magnitude of the sections of resistance 11 which are included in the two loop circuits. This operation does not involve a comparison of the resistances of the photocells or a comparison of the values of the two sections into which resistance 11 is divided by the tap 12, since the circuit does not have the general form of and does not function as a Wheatstone bridge. The electro-motive forces from self-generating cells are balanced against those differences of potential across resistors which are produced by currents from the respective cells. The circuit elements which divide the main series circuit into loop circuits are passive, i. e., do not include batteries or other sources of current which are essential for Wheatstone bridge operation.

When the system includes a measuring instrument or galvanometer 6, the apparatus may be employed for brilliancy, transmission or opacity measurements, and the substitution of a relay for the instrument permits the automatic operation of mechanism in accordance with variations in these factors.

Figure 2:
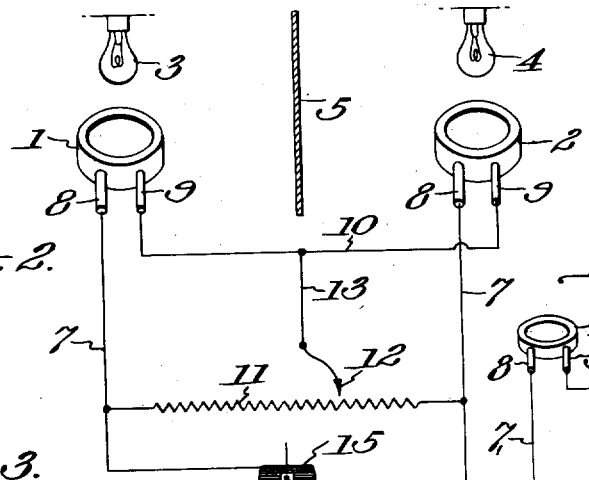
Fig. 2 is a fragmentary circuit diagram of a relay circuit embodying the invention.

In the relay system shown in Fig. 2, the general circuit arrangement is, or may be, substantially identical with that of Fig. 1, except that the moving coil 15 of a relay is connected in lead 7, the relay including a contact arm 16 which is movable between contacts 17, 18 to close a circuit including a current source 19 and, respectively, the responsive devices 20 or 21. By adjusting the tap 12 to bring the contact arm 16 into its neutral position when the cells develop equal currents, or currents bearing a predetermined ratio to each other, a departure in either sense from that initial condition of illumination and resulting current flow will result in a deflection of contact arm 16 towards one or the other of contacts 17, 18.

Figure 3:
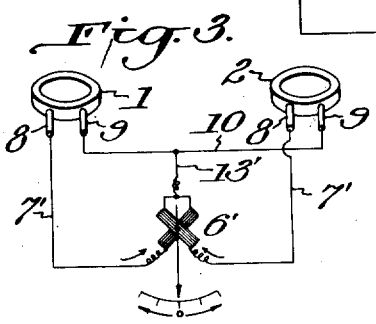

The circuit shown in Fig. 3 provides a simple and efficient instrument arrangement for measuring the relative illumination of the photoelectric cells 1, 2. Like electrodes 8 of each cell are connected by leads 7′ to the separate coils of coil sections of a measuring instrument 6′, and the common junction of the coils is connected by lead 13′ to the jumper or common lead 10 of the other pair of like electrodes 9 of the cells. The sections of the instrument coil are so positioned that the deflection of the pointer varies as the ratio of the currents generated by the separate cells.

Figure 4:
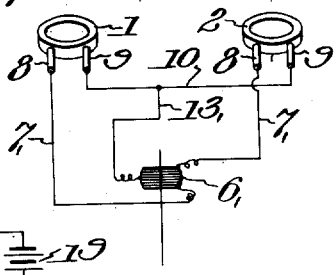
Figs. 3 and 4 are circuit diagrams of measuring systems embodying the invention.

In the similar measuring circuit of Fig. 4, the two sections of the moving coil system are so positioned that currents flowing from the two cells, as indicated by the arrows, exert opposite effects upon the motion of the complete coil system, and the resulting deflection is proportional to the difference in the current outputs of the two cells. As with the other forms of the invention, it is to be noted that the path of current flow of each cell does not include the other cell.

The exact circuit arrangement of networks embodying the invention is subject to some variation, so long as the current responsive device is located in a branch of the network in which current flow from the two cells tends to establish opposite effects, and the cells are located in the non-common portion of two loop circuits which have at least a portion in common.

I claim:

1. In a photoelectric cell circuit, a pair of photoelectric cells of the barrier layer type, a current responsive device, and a network connecting said cells and device to subject said device to the differential action of currents generated by the said cells; said network including a main series circuit comprising circuit elements joining one set of like terminals of said cells and connecting the device between the other set of like terminals, and means forming a shunt path dividing said main series circuit into two loop circuits having the cells in the non-common portions of the respective loop circuits, said means consisting of passive circuit elements connected between the joined terminals of said cells and said device.

2. A photoelectric cell circuit as claimed in claim 1, wherein said current responsive device comprises a measuring instrument having a moving coil formed in two sections, the respective sections being located in non-common portions of the two loop circuits.

3. In photoelectric apparatus for measuring the difference in the illumination at two points, a pair of barrier layer photoelectric cells adapted to be positioned at the said two points, a direct conductive connection between one set of like terminals of said cells, a current measuring instrument having an operating winding comprising two sections having a terminal in common, circuit elements completing a series circuit including both cells and both sections of said operating winding, and a lead connecting the common terminal of said operating winding to said conductive connection, whereby the common terminal of said winding is maintained at the common potential of the set of like cell terminals which are joined by said conductive connection.

4. In a photoelectric cell circuit, a pair of barrier layer type photoelectric cells, a current responsive device, leads connecting said cells to said device to subject the same to the opposing influence of currents generated by the separate cells, and additional circuit elements of passive type forming a path of current flow for each cell which is substantially independent of the other cell.

5. In apparatus of the type stated, a pair of photoelectric cells of the barrier layer type and each having a pair of electrodes, a current responsive device connected between similar electrodes of said pair of cells, a lead connecting the other electrodes of said cells, a resistance shunting said device, and a passive connection from a point on said resistance to said lead.

6. Apparatus as claimed in claim 5, wherein said connection includes a tap adjustable along said resistance.

7. Apparatus as set forth in claim 5, wherein said device is a current measuring instrument.

8. Apparatus as set forth in claim 5, wherein said device is a relay, and said relay includes a contact arm movable in response to the difference of the currents generated by said cells, and a contact adapted to be engaged by said contact arm.

9. A device of the character described comprising a plurality of spaced light-sensitive means capable of generating an electric current, electrically actuated means connected to each of said light-sensitive means in such manner that the current from one light-sensitive means opposes that from another, and means adapted to be actuated by said electrically actuated means when the amounts of current generated by two of the light-sensitive means are unequal.

10. A photoelectric control system comprising a pair of photoelectric cells of the barrier layer type, a current relay having relatively movable contacts, circuit means connecting said cells and relay to subject said relay to opposing effects of currents generated by the respective cells, and controlled means having a circuit in which said relay contacts are included.

11. In apparatus for photoelectric measurement, control and the like, the combination of a pair of photoelectric cells of the barrier layer type, a current responsive device, and circuit elements connecting said device to said cells to influence said device in accordance with the difference in the current outputs of the two cells; said network including for each cell a circuit that effectively excludes the other cell and includes resistance.

12. In apparatus for photoelectric measurement, control and the like, the combination of a pair of photoelectric cells of the barrier layer type, circuit elements forming for each cell a closed circuit in which the current flow established by that cell is substantially independent of the other cell, said closed circuits each including resistance means across which a potential drop appears when current flow is established in that circuit by the associated cell, and a current responsive device connected to said resistances to subject the device to a current flow that varies with the difference in the current outputs of the two cells.

WM. NELSON GOODWIN, JR.